US011475388B2

(12) United States Patent
Karube et al.

(10) Patent No.: US 11,475,388 B2
(45) Date of Patent: Oct. 18, 2022

(54) WORK MANAGEMENT SYSTEM

(71) Applicant: HITACHI CONSTRUCTION MACHINERY CO., LTD., Tokyo (JP)

(72) Inventors: Isao Karube, Tokyo (JP); Hidehiro Iizuka, Tokyo (JP); Masami Kamibayashi, Tokyo (JP); Ryota Niizeki, Tokyo (JP); Kunitsugu Tomita, Tokyo (JP); Hiroshi Watanabe, Tokyo (JP); Hiroyuki Adachi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/274,832

(22) PCT Filed: Jan. 22, 2020

(86) PCT No.: PCT/JP2020/002060
§ 371 (c)(1),
(2) Date: Mar. 10, 2021

(87) PCT Pub. No.: WO2020/170696
PCT Pub. Date: Aug. 27, 2020

(65) Prior Publication Data

US 2022/0027829 A1 Jan. 27, 2022

(30) Foreign Application Priority Data

Feb. 22, 2019 (JP) ............................ JP2019-030293

(51) Int. Cl.
*G06Q 10/06* (2012.01)
*G07C 5/06* (2006.01)

(52) U.S. Cl.
CPC . *G06Q 10/06393* (2013.01); *G06Q 10/06395* (2013.01); *G07C 5/06* (2013.01)

(58) Field of Classification Search
None
See application file for complete search history.

(56) References Cited

U.S. PATENT DOCUMENTS 9,303,390 B2 4/2016 Nagato et al.
2007/0268852 A1* 11/2007 Stegmaier ............ A01B 79/005 370/328

(Continued)

FOREIGN PATENT DOCUMENTS

| | | | |
|---|---|---|---|
| CN | 104736773 A | | 6/2015 |
| JP | 4173121 B2 | | 10/2008 |
| JP | 2009002109 A | * | 1/2009 |

OTHER PUBLICATIONS

Shehadeh et al. "Selection of heavy machinery for earthwork activities: A multi-objective optimization approach using a genetic algorithm" (Year: 2021).*

(Continued)

*Primary Examiner* — Sujay Koneru
(74) *Attorney, Agent, or Firm* — Mattingly & Malur, PC

(57) ABSTRACT

A server device for generating and outputting work management information of at least one carrier. The server device comprises a storage device for storing a program for generating work management information, and a controller for reading the program from the storage device and generating work management information by executing the program. The controller performs: a process of acquiring position information about at least one carrier; a process of generating, based on the position information, work type information indicating whether the carrier is performing a predetermined work or moving; a process of calculating a required time for each work type information item of the carrier; a process of comparing the required time for each work type information item and extracting a work element with low work efficiency based on a first rule concerning (Continued)

required time; and a process of outputting the extracted work element with low work efficiency.

8 Claims, 14 Drawing Sheets

(56) References Cited

U.S. PATENT DOCUMENTS

2008/0249679 A1* 10/2008 Matsuda .................. E02F 9/26
701/50
2010/0245587 A1* 9/2010 Otani ...................... G06T 7/277
348/169
2013/0035978 A1* 2/2013 Richardson ............ G06Q 50/08
705/7.27
2013/0046525 A1* 2/2013 Ali ....................... A01B 79/005
703/6
2014/0244098 A1* 8/2014 Ueda ...................... G06Q 50/02
701/29.3
2016/0247395 A1* 8/2016 Sugihara .................. G08G 1/20
2016/0300175 A1* 10/2016 Talmaki ........... G06Q 10/06315
2017/0328030 A1* 11/2017 Yamada .................. E02F 9/262
2018/0080199 A1* 3/2018 Deguchi .............. G01C 15/002
2018/0218304 A1* 8/2018 Shike ................. G06Q 10/0631
2018/0258610 A1* 9/2018 Elkins ................... B60W 10/20
2019/0218749 A1* 7/2019 Hiromatsu ............ E02F 9/2045
2019/0370725 A1* 12/2019 Ha ........................ E02F 9/2054
2019/0370726 A1* 12/2019 Ha ................. G06Q 10/063114
2020/0034766 A1* 1/2020 Borges ................... G06Q 30/08
2020/0042921 A1* 2/2020 Itou ........................ G06Q 10/06
2020/0217263 A1* 7/2020 Park ........................ E02F 9/267
2020/0256038 A1* 8/2020 Veneshetty ............... E02F 9/26
2020/0364952 A1* 11/2020 Sano ...................... G07C 5/008
2021/0056772 A1* 2/2021 Sakurai ................ G05D 1/0212
2021/0110488 A1* 4/2021 Onishi ................... G06Q 50/08
2021/0124359 A1* 4/2021 Wei ......................... E02F 3/434
2021/0131073 A1* 5/2021 Wisley .................... E02F 9/205

OTHER PUBLICATIONS

International Search Report of PCT/JP2020/002060 dated Apr. 21, 2020.

* cited by examiner

FIG. 5

| | | | |
|---|---|---|---|
| Setting information | Heavy equipment area information | Area of site | |
| | | Other (moving) | |
| | Work information | Site | Excavation |
| | | | Loading |
| | | | Standby |
| | | Other | Moving |
| | | | Standby |
| | | | Other work |
| | Machine type information | | |

FIG. 6

| | | | |
|---|---|---|---|
| Setting information | Carrier area information | Area of site | |
| | | Area of dumping location | |
| | | Other (moving) | |
| | Work information | Site | Loading |
| | | | Standby |
| | | | Travelling |
| | | Dumping location | Dumping |
| | | | Standby |
| | | | Travelling |
| | | Other | Outbound path movement |
| | | | Return path movement |
| | Machine type information | | |
| | Cycle information | | |

FIG. 7

| | |
|---|---|
| Received information | Position information |
| | Time information |
| | Machine identifying information |
| | Operation information |

FIG. 10

| | | | |
|---|---|---|---|
| Determination results (each sample) | Area | Site | |
| | | Other | |
| | Work | Site | Excavation |
| | | | Loading |
| | | | Standby |
| | | Other | Moving |
| | | | Standby |
| | | | Other work |

FIG. 11

| | | | |
|---|---|---|---|
| Determination results (each sample) | Area | Site | |
| | | Dumping location | |
| | | Other (moving) | |
| | Work | Site | Loading |
| | | | Standby |
| | | | Travelling |
| | | Dumping location | Dumping |
| | | | Standby |
| | | | Travelling |
| | | Movement | Outbound path |
| | | | Return path |
| | Cycle | | |

FIG. 12

| ID | Machine identifying information | Time information | Position information | Area | Work | Work 2 | Cycle |
|---|---|---|---|---|---|---|---|
| 1 | Carrier 2-1 | XX:XX | (X1,Y1) | Site | Site | Travel | 1 |
| 2 | Carrier 2-1 | XX:XX | (X2,Y2) | Site | Site | Standby | 1 |
| 3 | Carrier 2-1 | XX:XX | (X2,Y2) | Site | Site | Standby | 1 |
| 4 | Carrier 2-1 | XX:XX | (X2,Y2) | Site | Site | Standby | 1 |
| 5 | Carrier 2-1 | XX:XX | (X3,Y3) | Site | Site | Loading | 1 |
| 6 | Carrier 2-1 | XX:XX | (X3,Y3) | Site | Site | Loading | 1 |
| 7 | Carrier 2-1 | XX:XX | (X3,Y3) | Site | Site | Travel | 1 |
| 8 | Carrier 2-1 | XX:XX | (X4,Y4) | Other | Moving | Travel | 2 |
| 9 | Carrier 2-1 | XX:XX | (X5,Y5) | Other | Moving | Travel | 2 |
| | … | | | | | | |

FIG. 13

| | | |
|---|---|---|
| Computation/aggregate results | Transported amount/number of times | Each carrier |
| | | Each time band |
| | | Each dumping location |
| | Time per cycle | Each carrier |
| | | Each time band |
| | | Each dumping location |
| | Time per work | Each carrier |
| | | Each time band |
| | | Each dumping location |

FIG. 15
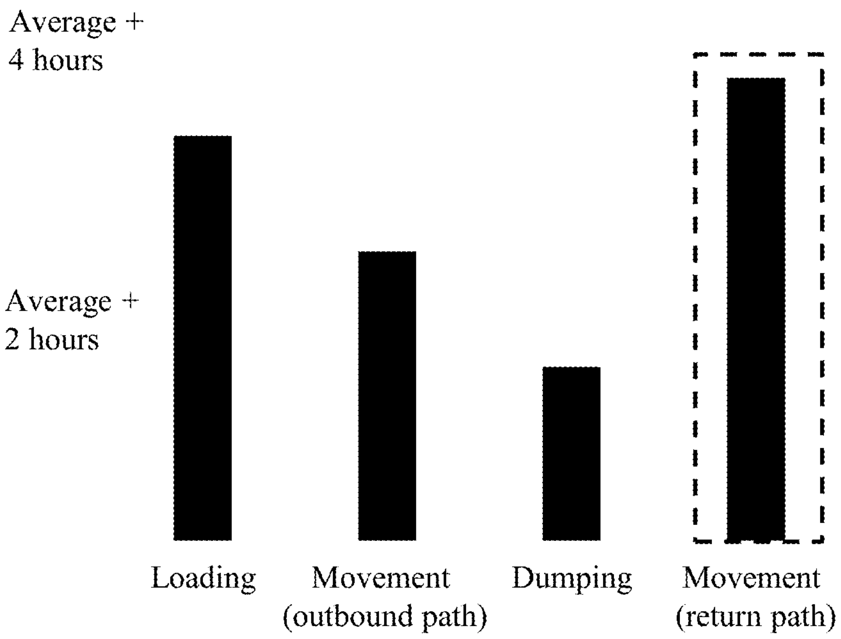
(a)
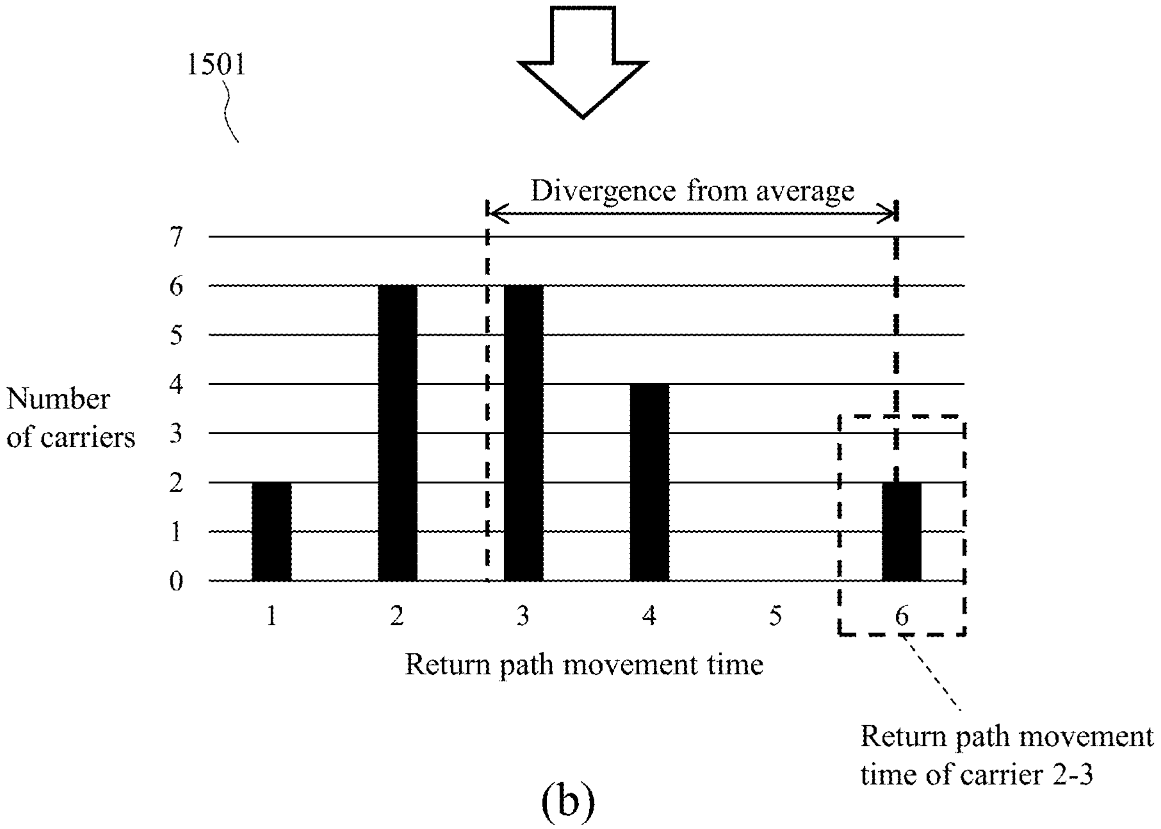
(b)

WORK MANAGEMENT SYSTEM

TECHNICAL FIELD

The present invention relates to a construction management system for managing the work status of carriers, work machines and the like.

BACKGROUND ART

At earth-moving construction sites where work is done using carriers, such as dump trucks, and work machines, such as hydraulic shovels and the like for performing loading onto the carriers, it is important for the manager (foreman) of the construction site to keep track of the work status and the like of the construction site. Additionally, the manager may also be asked to make changes to work plans in accordance with the work status, or to improve work efficiency.

According to a conventional method for improving work machine efficiency, target values of parameters of a work machine are set, and differences from the target values are indicated to improve efficiency. For example, Patent Literature 1 discloses that target values are set with respect to hydraulic pressure and engine rotational speed, and prepared messages are displayed if the target values are not reached.

CITATION LIST

Patent Literature

Patent Literature 1: JP 4173121

SUMMARY OF INVENTION

Technical Problem

However, the technique disclosed in Patent Literature 1 involves simply setting target values, comparing the target value set for a machine operation state with an actual frequency distribution, and outputting a prepared message in accordance with the difference. Thus, although the operation of a work machine such as a hydraulic shovel is sensed and the work efficiency of each operation is brought closer to the target value, when the target is reached, no more improvement can be expected. Further, the carriers at the earth-moving work site may be different on a daily basis because of rentals, making it difficult or very cumbersome, if not impossible, to set target values for all the machines. Moreover, in work management for the earth-moving work site as a whole, it is required to keep track of the state of not just the work machine performing the loading work, but also the states of a plurality of machines, including the work of carriers transporting the earth excavated at the earth-moving construction site, and to improve efficiency.

The present invention has been made in view of the above circumstance, and provides techniques for improving work efficiency by identifying elements such as work and carriers having relatively low efficiency, irrespective of target values.

Solution to Problem

In order to solve the problem, the present invention provides a server device for generating and outputting work management information for managing a work status of at least one carrier. The server device includes a storage device for storing a program for generating work management information, and a controller for reading the program from the storage device and generating the work management information by performing the program. The controller performs: a process of acquiring position information about at least one carrier; a process of generating, based on the position information, work type information indicating whether the carrier is performing a predetermined work or moving; a process of calculating a required time for each work type information item of the carrier; a process of comparing the required time for each work type information item and extracting a work element with low work efficiency based on a first rule concerning required time; and a process of outputting the extracted work element with low work efficiency.

Additional features of the present invention will become apparent from the description provided herein and the attached drawings. Aspects of the present invention may be achieved and realized by various element and combinations of elements as well as by aspects set forth in the following detailed description and the appended claims.

It should be understood that the descriptions provided herein are merely exemplary and in no way limit the scope of the claims or application examples.

Advantageous Effects of Invention

According to the present invention, it is possible to easily keep track of the work status of work machines and carriers operating in a construction site, extract elements having different work efficiency tendencies, and improve the work.

BRIEF DESCRIPTION OF DRAWINGS

FIG. 5 illustrates a configuration example of heavy equipment setting information that is set with respect to heavy equipment data.

FIG. 6 illustrates a configuration example of carrier setting information that is set with respect to a carrier.

FIG. 7 illustrates an example of information (including position information, time information, machine identifying information, operation information and the like) that a network interface in the construction management system receives.

FIG. 10 illustrates a configuration example of determination results of the area and work of the heavy equipment 1 obtained by the work determination process for the heavy equipment 1 (see FIG. 8).

FIG. 11 illustrates a configuration example of determination results of the area and work of the carriers 2-1 to 2-10 obtained by the carrier work determination process (see FIG. 9).

FIG. 12 illustrates an example of accumulation of the determination results of area and work of the carriers 2-1 to 2-10.

FIG. 13 illustrates an example of items of computation processing results stored in a computation/aggregate results storage unit 606.

FIG. 15 illustrates an example of a method for extracting a carrier having low work efficiency.

DESCRIPTION OF EMBODIMENTS

The disclosure of the present embodiment relates to a construction management system with which it is possible to easily keep track of the work statuses of a plurality of work machines and carriers operating in a construction site, and to improve work efficiency by identifying elements, such as work and carriers, that have relatively low work efficiency, irrespective of target values.

In the following, an embodiment of the present invention will be described with reference to the attached drawings. In the attached drawings, functionally similar elements may be designated with similar numerals. While the attached drawings depict a concrete embodiment and implementation examples in accordance with the principles of the present invention, these are provided to aid the understanding of the present disclosure and are not to be taken as in any way limiting the present invention. Various modifications may be made and implemented without changing the subject matter of the present invention. Various numerical values and the like used in the present embodiment are examples and may be modified in various ways, as needed.

While the present embodiment is described in sufficient detail to enable those skilled in the art to practice the present invention, it is to be understood that other implementations are also possible, and that changes in configuration or structure and substitutions of various element are possible without departing from the scope and spirit of the technical concepts of the present invention.

Further, as will be described below, an embodiment of the present invention may be implemented in software running on a general-purpose computer, dedicated hardware, or a combination of software and hardware.

In the following description, respective information items of the present invention will be described in "table" format. However, such information items may not necessarily be expressed in data structure of tables, but may be expressed in data structures of a list, a database, a queue and the like, or in other data structures.

In the following, each process in the embodiment of the present invention will be described by referring to a "program" as subject (actor). However, since a program is executed by a controller to perform a specified process using a memory and a communication port (communication control device), the description may refer to a controller as subject.

<Overall Configuration of Construction Management System>

Figure 1:
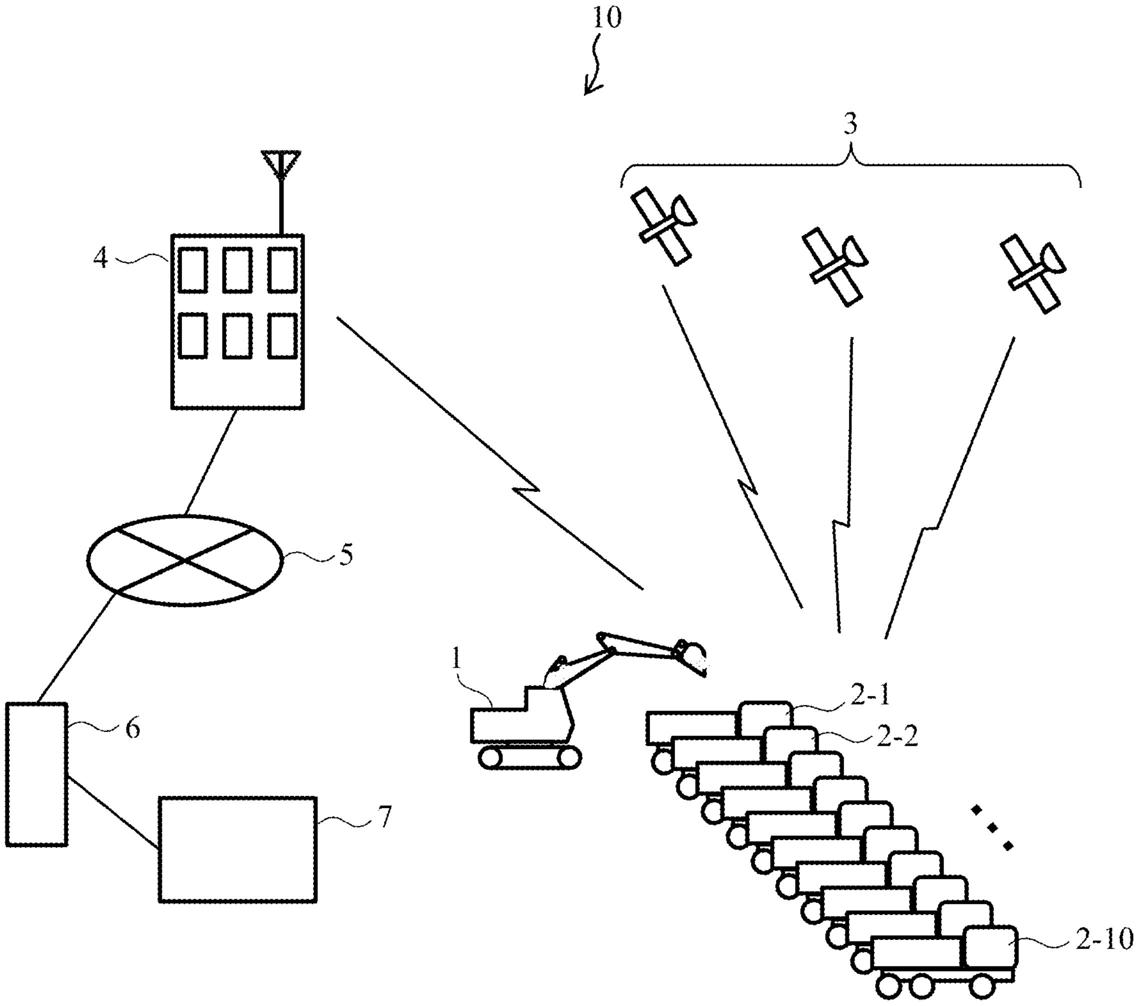
FIG. 1 illustrates an overall schematic configuration of a construction management system 10 according to the present embodiment.

FIG. 1 illustrates an overall schematic configuration of a construction management system 10 according to the present embodiment.

As illustrated in FIG. 1, the construction management system 10 includes: a predetermined communication device (for example, a base station of a communications company) 4 for position information about the heavy equipment 1, such as a hydraulic shovel, and position information about the carriers 2-1 to 2-10, such as dump trucks, in an earth-moving construction site (which may be hereafter referred to simply as a "construction site" or a "site"); a server device 6 which collects and accumulates various data from the communication device 4 via an internet 5 (network); and a work terminal device 7 for a manager of the earth-moving construction site to confirm, for example, results of processing performed by the server device 6.

Specifically, in the construction management system 10, portable terminal devices installed in the heavy equipment 1 and the carriers (for example, dump trucks) 2-1 to 2-10 (or fixed terminals installed in the heavy equipment 1 and the carriers 2-1 to 2-10) receive radio waves (position information) from a plurality of positioning satellites 3 constituting a Global Navigation Satellite System (GNSS). Thereafter, each of the portable terminal devices that have received the radio waves transmits the respective position information to the server device 6 via a base station of a communications company (possibly via the communication device 4), lines, and the internet 5. The server device 6 subjects the received data to various processes, and transmits necessary information to the work terminal device 7 for confirmation by the manager of the earth-moving construction site. The work terminal device 7, in response to an instruction of the manager, displays results of processing performed by the server device 6 on a screen.

The heavy equipment 1 herein refers to a work machine capable of performing loading work with respect to the carriers 2-1 to 2-10, where the machine may have a plurality of work functions including excavation work, as well as loading work. The portable terminal devices are communication apparatus, such as smartphones, carried by the drivers (operators) of the heavy equipment 1 and the carriers 2-1 to 2-10. The portable terminal devices in the heavy equipment 1 and the carriers 2-1 to 2-10 may include not only GPS sensors for measuring position information, but also other sensors for measuring acceleration, angular speed, earth magnetism and the like. Instead of the portable terminal devices, terminal devices capable of communicating with the communication device 4 and the server device 6 (for example, mounted terminal devices) may be installed in the heavy equipment 1 and the carriers 2-1 to 2-10.

As illustrated in FIG. 1, in the construction management system 10 according to the present embodiment, the work terminal device 7 for confirmation by the manager of the earth-moving construction site is provided outside the earth-moving construction site. The work terminal device 7 is able to communicate with the server device 6 bi-directionally via communication lines or a network. Accordingly, the manager operating the work terminal device 7 can access the server device 6 via communication lines, cause the work state of the earth-moving construction site to be displayed on the work terminal device 7, and confirm its contents. The work terminal device 7 herein may be a general computer or a tablet capable of not just displaying the work state of the earth-moving construction site, but also performing various computations, work and the like.

The work terminal device 7 may be installed inside a building provided inside the earth-moving construction site, or may be a portable terminal device carried by the manager. Particularly, when the portable terminal device carried by the manager doubles as the work terminal device 7, it is possible to keep track of the work status of the earth-moving construction site selected by the manager, even when the manager is doing work at another location, for example.

<Internal Hardware Configuration of Server Device 6>

Figure 2:
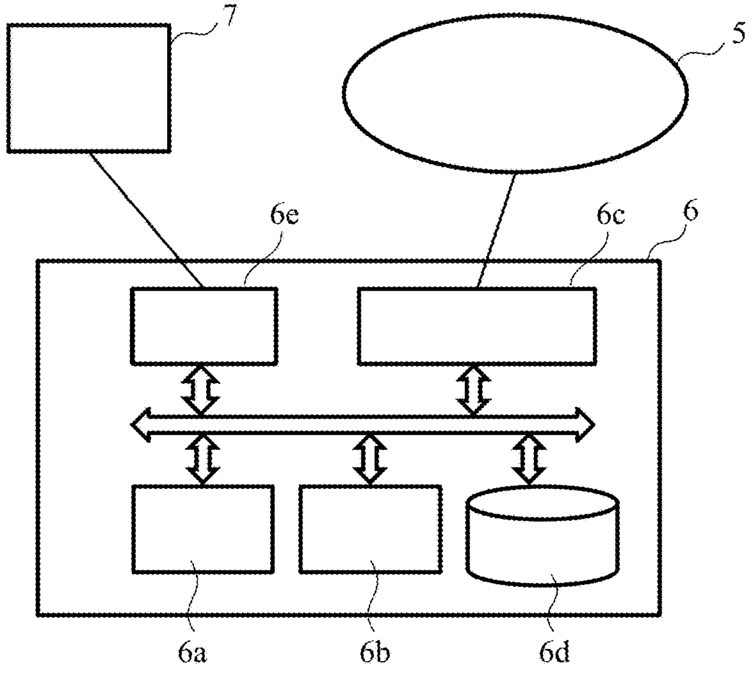
FIG. 2 illustrates an example of an internal hardware configuration of a server device 6 in the construction management system 10.

FIG. 2 illustrates an example of an internal hardware configuration of the server device 6 in the construction management system 10.

As illustrated in FIG. 2, the server device 6 includes, as an internal configuration, a computing unit 6*a*, a first storage unit 6*b*, a second storage unit 6*d*, a network interface 6*c*, and an external network interface 6*e*, for example. The work terminal device 7 is connected to the server device 6 via the external network interface 6*e*.

The computing unit 6*a* comprises a Central Processing Unit (CPU), for example, for performing various computation processes. That is, the computing unit 6*a* functions as a control device for governing and controlling the server device 6. For example, the computing unit 6*a*, in accordance with a program stored in the first storage unit 6*b*, performs a computation process related to various data inputted from the network interface 6*c*. The computing unit 6*a* also controls the network interface 6*c* and performs communication control for the server device 6 with respect to the communication lines.

The first storage unit 6*b* is a general main memory (main storage device) for temporarily storing programs and various data. Specifically, the first storage unit 6*b* temporarily stores a program executed by the computing unit 6*a*, and further temporarily stores various data inputted to the server device 6 and results of computation performed by the computing unit 6*a*. For example, the first storage unit 6*b* comprises a Dynamic Random Access Memory (DRAM). The results of computation performed by the computing unit 6*a* include, for example, results of determination of the positions of the heavy equipment 1 and the carriers 2-1 to 2-10, as will be described later, and results concerning an area chart indicating the transition of the positions in chronological order.

Meanwhile, the second storage unit 6*d* is a general storage (auxiliary storage device) for permanently storing various data. Specifically, the second storage unit 6*d* permanently stores the results of computation performed by the computing unit 6*a*. For example, the second storage unit 6*d* may comprise a hard disk drive (HDD) or a solid-state drive (SSD).

The work terminal device 7 comprising a conventional computer (including a controller, a memory, an input device, an output device and the like) or a tablet is connected to the external network interface 6*e*. The manager of the server device 6 can utilize the server device 6 and perform its maintenance and inspection by operating input devices (including, for example, a keyboard, a mouse, a touch panel, a mechanical switch, a pointing device and the like) of the work terminal device 7. The manager can also cause the utilization status, the maintenance and inspection status and the like to be displayed on the display of the work terminal device 7, and view the displayed output information. An output device, such as a printer, may be connected to the external network interface 6*e*.

With such configuration, in the construction management system 10 according to the present embodiment, the computing unit 6*a* of the server device 6 executes a display program for the work terminal device 7 at the work site, and transmits the result of computation of the program to the work terminal device 7 via communication lines, whereby the result is displayed on the display (display unit) thereof. Herein, the method for displaying the computation result on the display (display unit) of the work terminal device 7 may involve providing a display via a Web browser, or execution of a program provided in the work terminal device 7. The work terminal device 7 may be a portable-type computer device, such as a smartphone, for example.

<Conceptual Diagram of Construction Site and Work Area>

Figure 3:
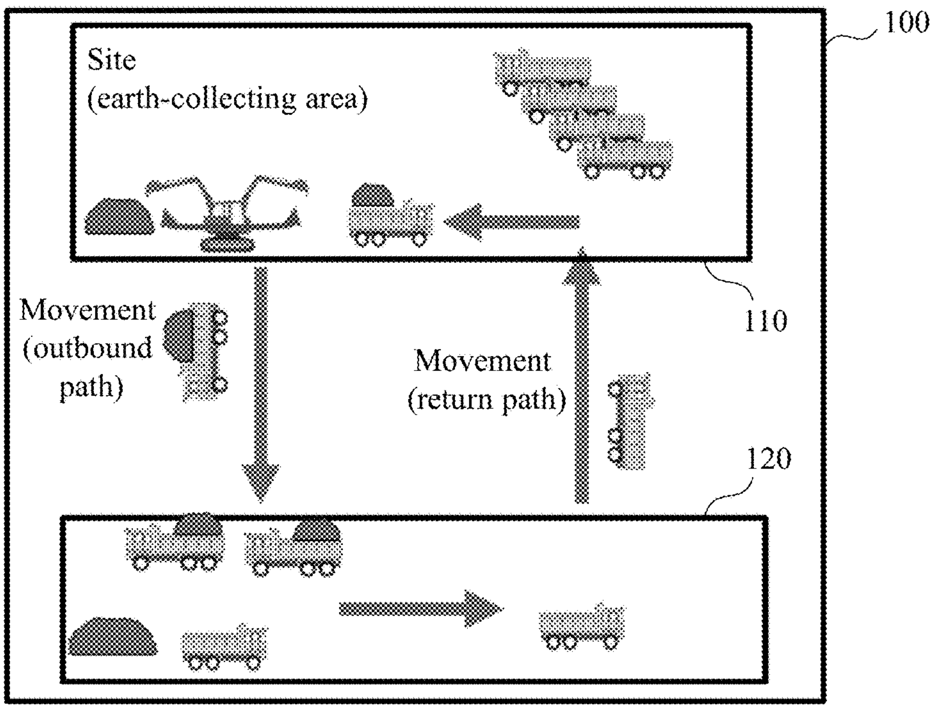
FIG. 3 illustrates a scene setting example in which the techniques according to the present embodiment may be applied.

FIG. 3 illustrates an example of a scene setting to which the techniques according to the present embodiment may be applied. The present embodiment is applied, for example, to work process management in a situation comprising a construction site, work areas, and an outbound path and a return path connecting the work areas.

As illustrated in FIG. 3, in the present embodiment, the construction site 100 has two work areas 110 and 120 set by a construction site manager. The work area 110 depicts an excavation site (hereafter referred to as the site), which is a location where the heavy equipment 1 performs excavation of earth and its loading onto the carriers 2-1 to 2-10 that have approached within a predetermined distance range relative to the heavy equipment 1. On the other hand, the work area 120 depicts a dumping location, which is a location where the carriers perform work of unloading earth that has been loaded at the work area 110. The carriers 2-1 to 2-10 also repeat the loading work in the work area 110 and the dumping work in the work area 120, and move between the work area 110 and the work area 120 a number of times.

<Functional Blocks of Server, and Contents of Various Setting Information>

Figure 4:
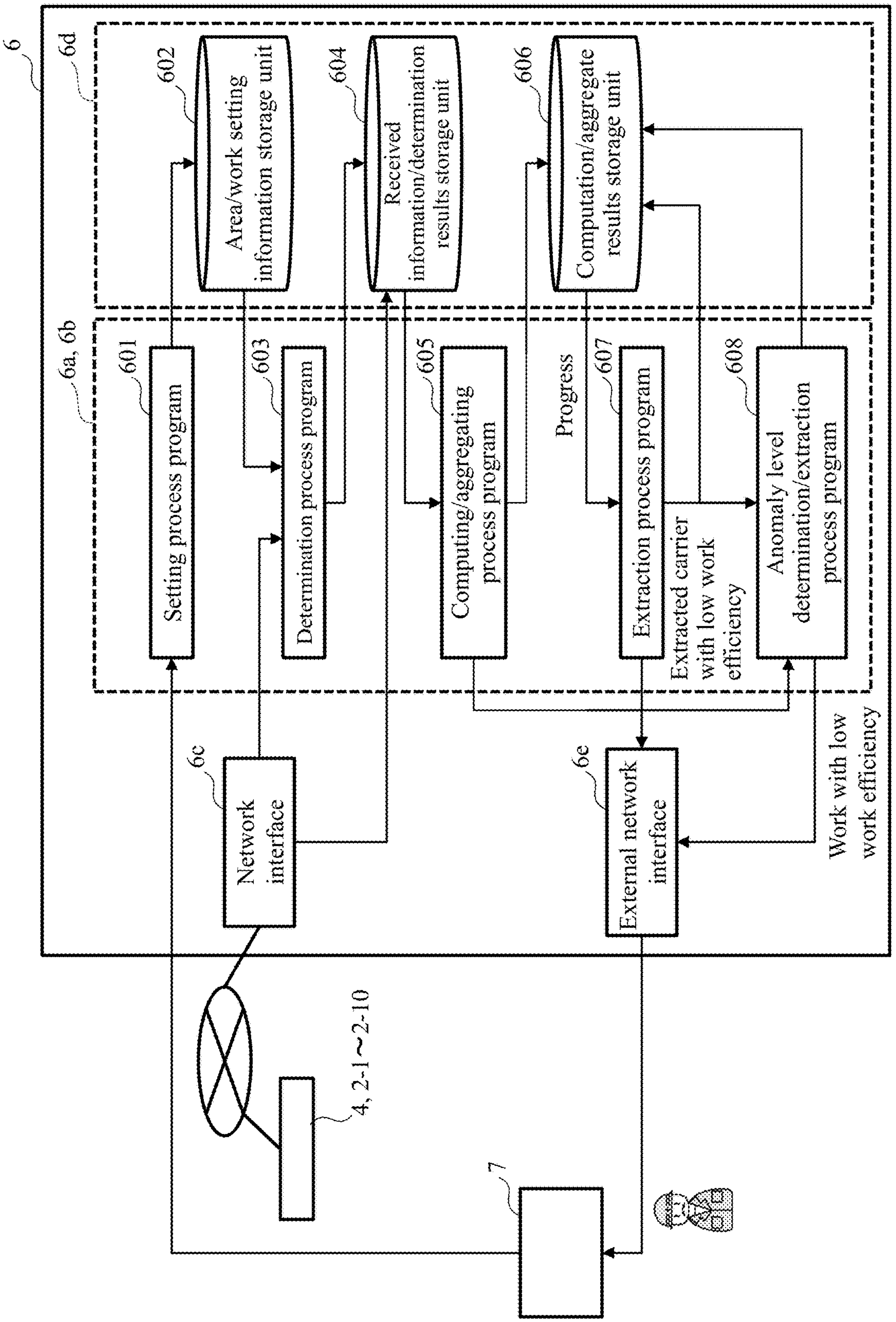
FIG. 4 illustrates a functional block diagram of the server device 6.

FIG. 4 is a functional block diagram of the server device 6. The server device 6 has the function to easily keep track of the work statuses of the heavy equipment 1 and the carriers 2-1 to 2-10 operating in the construction site 100 with respect to the work of FIG. 3, extract elements having different performance tendencies, and improve the work.

Referring to FIG. 4, the computing unit 6*a* reads various processing programs from the first storage unit 6*b*, loads the programs into an internal memory of the computing unit 6*a*, and performs the various processing programs. Data of processing results are stored in the second storage unit (storage) 6*d*.

First, the manager of the earth-moving construction site sets, via the work terminal device 7, area information, work information with respect to the machines including the heavy equipment 1 and the carriers 2-1 to 2-10, and cycle information with respect to the carriers 2-1 to 2-10. The area information represents a section designating a latitude, a longitude and the like on a map or in table format. The work information indicates work generated in each area and other locations according to each machine type. The cycle information is defined by the manager, for example. In the case of a carrier, for example, a series of work of moving from the site to the dumping location and back to the site may be defined as one cycle. As the manager sets each machine type, the work information, and the cycle information with respect to an area, the computing unit 6*a* executes a setting process program 601, and stores generated data in an area/work setting information storage unit 602 (storage 6*d*).

FIG. 5 illustrates a configuration example of heavy equipment setting information which is set with respect to the heavy equipment 1. The heavy equipment setting information includes, for example, heavy equipment area information, work information, and machine type information. The heavy equipment area information is set, for example, as a work site for excavation, loading and the like, and other areas. The work information identifies the type of work in each area, and, with respect to the site, for example, sets the three types of excavation, loading, and standby. For the other areas, the three types of movement, standby, and other work are set. The machine type information sets information for identifying the individual heavy equipment 1 and additionally sets specs, such as model, bucket capacity, and rated output. A plurality of work types may be set for an area.

FIG. 6 illustrates a configuration example of carrier setting information which is set with respect to the carriers 2-1 to 2-10. The carrier setting information is set, for example, as the area of the site, the area of the dumping location, and others. The work information, similarly to the heavy equipment 1, identifies the type of work in each area, and sets: load, standby, and travel in the site; dump, standby, and travel in the dumping location; and outbound path movement and return path movement as work for other areas. The outbound path movement means movement from the site to the dumping location, and the return path movement means movement from the dumping location to the site. The machine type information includes information for identifying the individual carrier, and additionally specs, such as model and maximum load capacity. The cycle information is setting information defining one cycle of transport by the carriers 2-1 to 2-10. Movement from the site to the dumping location and back to the site may be set as one cycle. In accordance with such setting information items, the computing unit 6*a* determines the area in which the heavy equipment 1 and the carriers 2-1 to 2-10 work and the type of the work. In the following, each determination process is described.

As illustrated in FIG. 4, the server device 6 receives via the network interface 6*c* position information transmitted from the heavy equipment 1 and the carriers 2-1 to 2-10 and the like, and stores the received information in the second storage unit (storage) 6*d*. The information received by the server device 6, as illustrated in FIG. 7, includes position information, time information, machine identifying information, operation information and the like. A determination process program 603, based on the received information and the information set by the manager, determines areas and work (type). The determination process program 603, in the case of the carriers 2-1 to 2-10, determines a cycle of the carriers 2-1 to 2-10 in accordance with the cycle information that has been set (see FIG. 6).

<Contents of Work Determination Process for Heavy Equipment 1>

Figure 8:
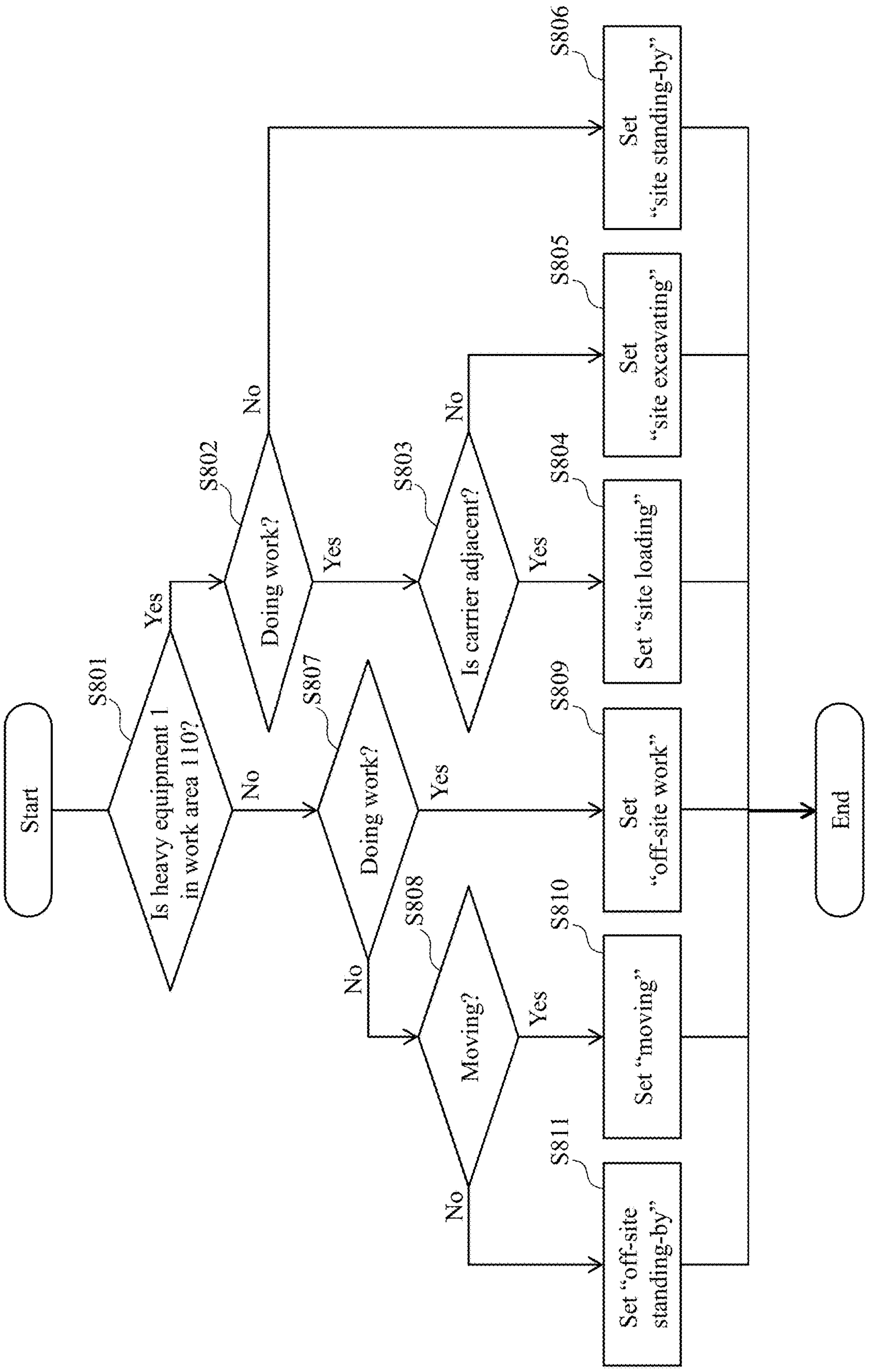
FIG. 8 is a flowchart (example) for describing an example of a heavy equipment work determination process for determining the type of work being performed by heavy equipment 1.

FIG. 8 is a flowchart (example) for describing an example of a heavy equipment work determination process for determining the type of work being performed by the heavy equipment 1. Herein, the steps of FIG. 8 will be described by referring to the determination process program 603 as being the actor of the work determination process. However, as noted above, the program is read and executed by the computing unit 6*a*. Thus, the determination process program 603 may be replaced by the computing unit (controller) 6*a*.

(i) Step 801

The determination process program 603 determines from the position information about the heavy equipment 1 whether the heavy equipment 1 is present in the work area 110. If the heavy equipment 1 is present in the work area 110 (Yes at step 801), the process advances to step 802. If the heavy equipment 1 is not present in the work area 110 (No at step 801), the process advances to step 807.

(ii) Step 802

The determination process program 603 determines whether the heavy equipment 1 is doing work. The determination as to whether the heavy equipment 1 is doing work or not may be made through utilization of, for example, information sensed by sensors installed on the heavy equipment 1 (for example, a sensor for sensing the handling of the heavy equipment 1 and a sensor for sensing actual motions, such as hydraulic motions), or a separately obtained manipulation log or the like may be used. If it is determined that the heavy equipment 1 is doing work (Yes at step 802), the process advances to step 803. If it is determined that the heavy equipment 1 is not doing work (No at step 802), the process advances to step 806.

(iii) Step 803

The determination process program 603 determines whether any of the carriers 2-1 to 2-10 is adjacent to the heavy equipment 1. The determination as to whether any of the carriers 2-1 to 2-10 is adjacent to the heavy equipment 1 may be performed through utilization of separately obtained beacon information as well as the position information about the heavy equipment 1 and the carriers 2-1 to 2-10. If it is determined that the carriers 2-1 to 2-10 are adjacent to the heavy equipment 1 (Yes at step 803), the process advances to step 804. If it is determined that the carriers 2-1 to 2-10 are not adjacent to the heavy equipment 1 (No at step 803), the process advances to step 805.

(iv) Step 804

The determination process program 603, if any of the carriers 2-1 to 2-10 is adjacent to the heavy equipment 1, determines that the heavy equipment 1 is performing loading work in the site, and sets the determination results of area and work of the heavy equipment 1 to “site loading”.

(v) Step 805

The determination process program 603, if none of the carriers 2-1 to 2-10 is adjacent to the heavy equipment 1, determines that the heavy equipment 1 is performing excavation work in the site, and sets the determination results of area and work of the heavy equipment 1 to “site excavating”.

(vi) Step 806

The determination process program 603, if the heavy equipment 1 is not doing work, determines that the heavy equipment 1 is in standby state in the site, and sets the determination results of area and work of the heavy equipment 1 to “site standing-by”.

(vii) Step 807

The determination process program 603, as at step 802, determines whether the heavy equipment 1 is doing work also when the heavy equipment 1 is present outside the work area 110. If it is determined that the heavy equipment 1 is doing work (Yes at step 807), the process advances to step 809. If it is determined that the heavy equipment 1 is not doing work (No at step 807), the process advances to step 808.

(viii) Step 808

The determination process program 603, if the heavy equipment 1 is not doing work, determines whether the heavy equipment 1 is moving. The determination as to whether the heavy equipment 1 is moving may be made by, for example, calculating speed based on a temporal change in the position information about the heavy equipment 1, or by a different method. If it is determined that the heavy equipment 1 is moving (Yes at step 808), the process advances to step 810. If it is determined that the heavy equipment 1 is not moving (No at step 808), the process advances to step 811.

(ix) Step 809

The determination process program 603, if the heavy equipment 1 is doing work, determines that the heavy equipment 1 is performing work outside the site, and sets the determination results of area and work of the heavy equipment 1 to "off-site work".

(x) Step 810

The determination process program 603, if the heavy equipment 1 is moving, determines that the heavy equipment 1 is moving, and sets the area and work determination results to "moving".

(xi) Step 811

The determination process program 603, if the heavy equipment 1 is not moving, determines that the heavy equipment 1 is standing by outside the site, and sets the area and work determination results to "off-site standing-by".

<Contents of Carrier Work Determination Process>

Figure 9:
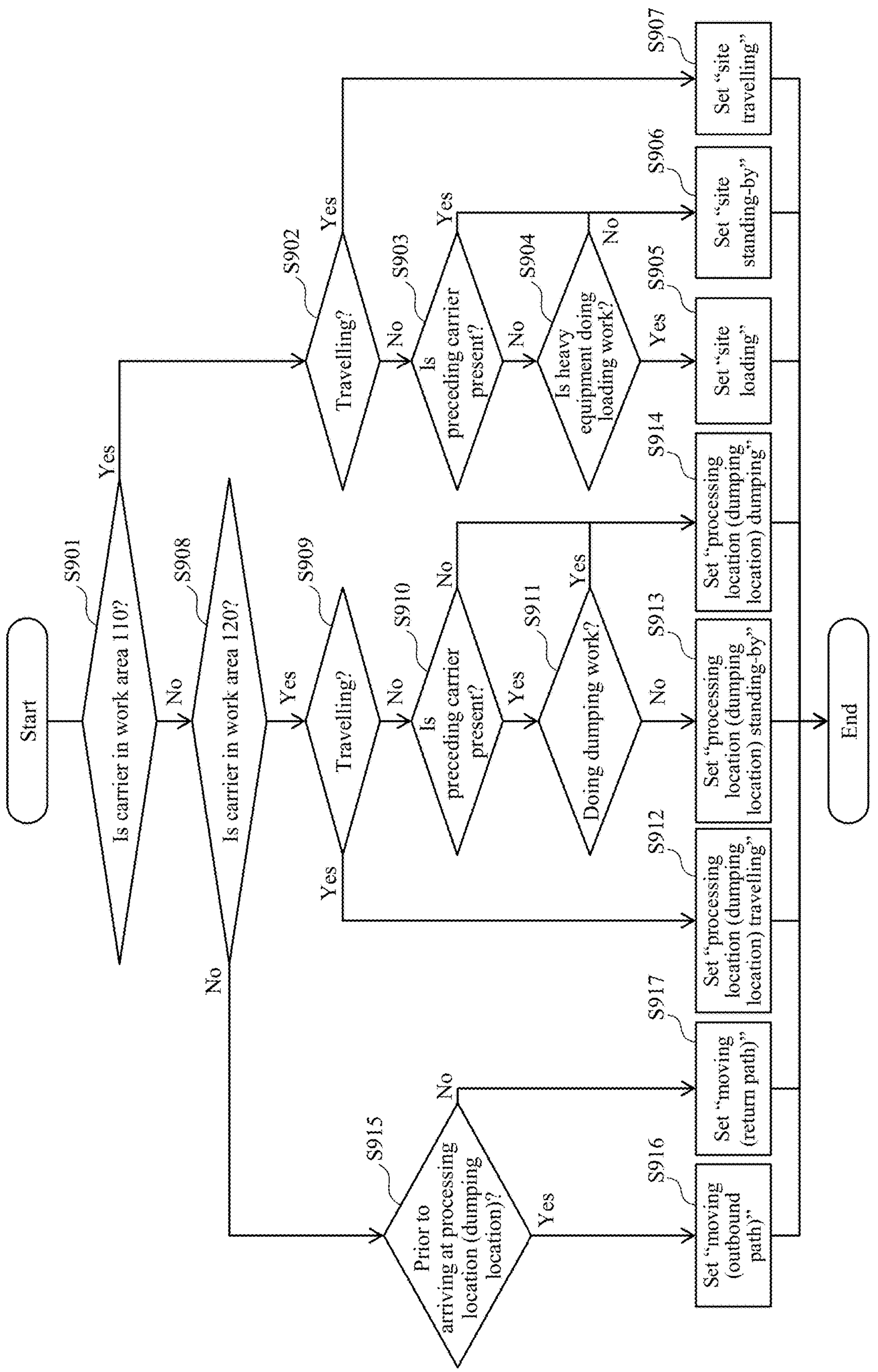
FIG. 9 is a flowchart describing an example of a carrier work determination process for determining the type of work being performed by the carriers 2-1 to 2-10.

FIG. 9 is a flowchart describing an example of a carrier work determination process for determining the type of work being performed by the carriers 2-1 to 2-10. Herein, the steps of FIG. 9 will be described by referring to the determination process program 603 as being the actor of the work determination process. However, as noted above, the program is read and executed by the computing unit 6*a*. Thus, the determination process program 603 may be replaced by the computing unit (controller) 6*a*.

(i) Step 901

The determination process program 603 determines whether the carriers 2-1 to 2-10 are present in the work area 110 based on the position information about each of the carriers 2-1 to 2-10. If it is determined that the carriers 2-1 to 2-10 are present in the work area 110 (Yes at step 901), the process advances to step 902. If it is determined that the carriers 2-1 to 2-10 are not present in the work area 110 (No at step 901), the process advances to step 908.

(ii) Step 902

The determination process program 603 determines whether the carriers 2-1 to 2-10 (the carrier being subjected to determination) are travelling. The determination as to whether the carriers 2-1 to 2-10 are travelling may be made, for example, by calculating speed from a temporal change in the position information about the carriers 2-1 to 2-10, or by a different technique. If it is determined that the carriers 2-1 to 2-10 are travelling (Yes at step 902), the process advances to step 907. If it is determined that the carriers 2-1 to 2-10 are not travelling (No at step 902), the process advances to step 903.

(iii) Step 903

The determination process program 603 determines whether there is a carrier preceding the carrier being subjected to determination. The determination at step 903 is performed, for example, with respect to each of the carriers 2-1 to 2-10 successively (one by one), to determine whether another carrier is present in the work area 110 previously. That is, the presence or absence of a preceding carrier is determined, for example, based on the presence or absence of a separate carrier that has entered the work area 110 and remaining therein earlier than the carrier being determined. If a preceding carrier is present (Yes at step 903), the process advances to step 906. If a preceding carrier is not present (No at step 903), the process advances to step 904.

(iv) Step 904

The determination process program 603 determines whether the heavy equipment 1 is doing work for loading adjacent to the carrier being subjected to determination. Whether the heavy equipment is adjacent to the carrier being subjected to determination may be determined similarly to the process at step 803, for example, through utilization of separately obtained beacon information as well as the position information about the heavy equipment 1 and the carriers 2-1 to 2-10. Whether the carrier being subjected to determination is doing work for loading may be determined similarly to the process at step 802, for example, by utilizing information sensed by sensors installed on the heavy equipment 1 adjacent to the carrier being subjected to determination (for example, a sensor for sensing the handling of the heavy equipment 1 and a sensor for sensing actual motions, such as hydraulic motions), or by utilizing a separately obtained manipulation log or the like. If the adjacent heavy equipment 1 is doing work for loading (Yes in step 904), the process advances to step 905. If the heavy equipment 1 is not doing work for loading (No in step 904), the process advances to step 906.

(v) Step 905

The determination process program 603, if loading work is being performed by the adjacent heavy equipment 1, determines that the carriers 2-1 to 2-10 (the carrier being subjected to determination) is doing work for loading in the site, and sets the determination results of area and work of the carrier being subjected to determination to "site loading".

(vi) Step 906

The determination process program 603, if loading work is not being performed by the heavy equipment 1, determines that the carriers 2-1 to 2-10 (the carrier being subjected to determination) is standing by in the site, and sets the determination results of area and work of the carrier being subjected to determination to "site standing-by".

(vii) Step 907

The determination process program 603, if the carriers 2-1 to 2-10 (the carrier being subjected to determination) are travelling, determines that the carriers 2-1 to 2-10 (the carrier being subjected to determination) are travelling in the site, and sets the determination results of area and work of the carrier being subjected to determination to "site travelling".

(viii) Step 908

The determination process program 603, if it is determined that the carriers 2-1 to 2-10 are not present in the work area 110, determines whether, based on the position information about each of the carriers 2-1 to 2-10, the carriers 2-1 to 2-10 (the carrier being subjected to determination) are in the work area 120. If it is determined that the carriers 2-1 to 2-10 (the carrier being subjected to determination) are in the work area 120 (Yes in step 908), the process advances to step 909. If it is determined that the carriers 2-1 to 2-10 (the carrier being subjected to determination) are not in the work area 120 (No in step 908), the process advances to step 915.

(ix) Step 909

The determination process program 603, if the carriers 2-1 to 2-10 are in the work area 120, determines, similarly to step 902, whether the carriers 2-1 to 2-10 (the carrier being subjected to determination) are travelling. If it is determined that the carriers 2-1 to 2-10 are travelling (Yes in step 909), the process advances to step 912. If it is determined that the carriers 2-1 to 2-10 are not travelling (No in step 909), the process advances to step 910.

(x) Step 910

The determination process program 603, if the carriers 2-1 to 2-10 are not travelling, determines, similarly to step 903, whether there is a carrier preceding the carrier being subjected to determination. If a preceding carrier is present (Yes in step 910), the process advances to step 911. If a preceding carrier is not present (No in step 910), the process advances to step 914.

(xi) Step 911

The determination process program 603, if there is a carrier preceding the carrier being subjected to determination, determines whether the carrier 2-1 to 2-10 being subjected to determination is doing work for dumping earth. Whether the carrier 2-1 to 2-10 being subjected to determination is doing work for dumping earth or not may be determined, for example, depending on whether a lifting/lowering operation of the carrier's bed (bed onto which earth is loaded) has been sensed (using a sensor attached to the carrier). If it is determined that the carrier 2-1 to 2-10 being subjected to determination is not doing work for dumping earth (No in step 911), the process advances to step 913. If it is determined that the carrier 2-1 to 2-10 being subjected to determination is doing work for dumping earth (Yes in step 911), the process advances to step 914.

(xii) Step 912

The determination process program 603, if the carriers 2-1 to 2-10 are travelling, determines that the carriers 2-1 to 2-10 (the carrier being subjected to determination) are travelling in the dumping location, and sets the determination results of area and work of the carrier being subjected to determination to "processing location (dumping location) travelling".

(xiii) Step 913

The determination process program 603, if the carriers 2-1 to 2-10 are not doing work for dumping earth, determines that the carriers 2-1 to 2-10 (the carrier being subjected to determination) are standing by in the dumping location, and sets the determination results of area and work of the carrier being subjected to determination to "processing location (dumping location) standing-by".

(xiv) Step 914

The determination process program 603, if the carriers 2-1 to 2-10 are doing work for dumping earth, determines that the carriers 2-1 to 2-10 (the carrier being subjected to determination) are carrying out a dumping process in the dumping location, and sets the determination results of area and work of the carrier being subjected to determination to "processing location (dumping location) dumping".

(xv) Step 915

The determination process program 603, if the carriers 2-1 to 2-10 are not in the work area 120, determines whether, based on the position information about the carriers 2-1 to 2-10 (the carrier being subjected to determination), the carriers 2-1 to 2-10 (the carrier being subjected to determination) are arriving at the dumping location in the area 120. The determination as to whether the dumping location is being arrived at may be performed based on a change in the position information (whether approaching or moving away from the dumping location) about the carriers 201 to 2-10 (the carrier being subjected to determination). If it is determined that the dumping location is being arrived at (Yes in step 915), the process advances to step 916. If it is determined that the dumping location is not being arrived at (the work area 120 is being left behind) (No in step 915), the process advances to step 917.

(xvi) Step 916

The determination process program 603, if the carriers 2-1 to 2-10 are arriving at the dumping location, determines that the carriers 2-1 to 2-10 (the carrier being subjected to determination) are arriving at the dumping location (approaching the dumping location) and sets the determination results of area and work of the carrier being subjected to determination to "moving (outbound path)".

(xvii) Step 917

The determination process program 603, if the carriers 2-1 to 2-10 are not arriving at the dumping location, determines that the carriers 2-1 to 2-10 (the carrier being subjected to determination) are not arriving at the dumping location (moving away from the dumping location), and sets the determination results of area and work of the carrier being subjected to determination to "moving (return path)".

<Determination Results of Area and Work for Heavy Equipment (Example)>

FIG. 10 illustrates a configuration example of the determination results of area and work of the heavy equipment 1 obtained by the work determination process for the heavy equipment 1 (see FIG. 8). The items included in the results of area and work of the heavy equipment 1 are obtained in accordance with the information (items) set in the heavy equipment setting information (see FIG. 5).

The determination results of area and work of the heavy equipment 1 comprise information consisting of a pair of determined area and determined work. Because the work determination process for the heavy equipment 1 (see FIG. 8) is performed, for example, for each predetermined time interval (for example, every 10 seconds), the determination results are created each time the work determination process is performed. At a certain determination timing, the heavy equipment 1 may be determined to be doing work for loading in the site, for example; at another determination timing, the heavy equipment 1 may be determined to be standing by outside the site.

<Determination Results of Area and Work of Carrier (Example)>

FIG. 11 illustrates a configuration example of the determination results of the area and work of the carriers 2-1 to 2-10 obtained by the carrier work determination process (see FIG. 9). The items included in the results of the area and work of the carriers 2-1 to 2-10 are obtained in accordance with the information (items) set in the carrier setting information (see FIG. 6). The "cycle" in the determination results illustrated in FIG. 11 is counted in accordance with the cycle information set in FIG. 6.

The determination results of the area and work of the carriers 2-1 to 2-10 comprise information consisting of a pair of determined area and determined work. Because the work determination process for the carriers 2-1 to 2-10 (see FIG. 9) is performed for each predetermined time interval (for example, every 10 seconds), for example, determination results are created each time the work determination process is performed. At a certain determination timing, the carrier 2-1 may be determined to be doing work for loading in the site, for example; at another determination timing, the carrier 2-1 may be determined to be travelling in the dumping location. Such determination results are accumulated with respect to each of the carriers 2-1 to 2-10.

FIG. 12 illustrates an example of accumulation of determination results of the area and work of the carriers 2-1 to 2-10. For example, the determination results of the area and work with respect to the carriers 2-1 to 2-10 are received by the network interface 6*c* and stored in a received information/determination results storage unit 604.

The determination results of area and work are in a format in which, with respect to each of the data items of the carriers 2-1 to 2-10 (machine identifying information, time information, position information), the area information, work information, and cycle information obtained by the determination process are added. In the example of FIG. 12, it can be confirmed from the determination results that the carrier 2-1 has travelled in the site, stood by, performed loading work, and then started to move to the dumping location. While in the example of FIG. 12, only the carrier 2-1 is described, such information is accumulated with respect to all the carriers 2-1 to 2-10.

The results of determination of area and work are fed to the computing/aggregating process program 605 to calculate transported amounts, time per cycle and the like for each carrier and work and in each time band, and stored in the computation/aggregate results storage unit 606 in the second storage unit (storage) 6*d*.

<Example of Computation Result Items>

FIG. 13 illustrates an example of items of computation processing results stored in the computation/aggregate results storage unit 606.

The computation and aggregating process program 605 computes the transported amount/number of times, the time per cycle, and the time per work for each of the carriers 2-1 to 2-10 and in each time band, and the results are stored in the computation/aggregate results storage unit 606. In the present embodiment, the transported amount is obtained by calculating the product of the load capacity and the number of cycles of each carrier, and then adding up the calculated values of all the carriers.

<Outline of Low Work Efficiency Extraction>

Figure 14:
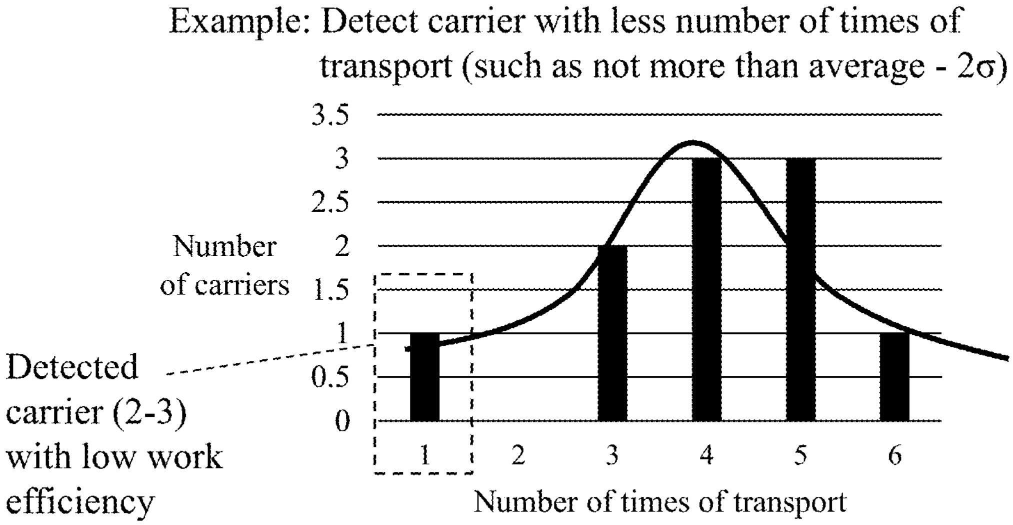
FIG. 14 illustrates a method for extracting a carrier having low work efficiency in the construction management system according to the present embodiment.

An extraction process program 607 utilizes the computation/aggregate results stored in the computation/aggregate results storage unit 606 and extracts carriers, time bands, work and the like having low work efficiency compared to other carriers. FIG. 14 illustrates an example of a method for extracting carriers having low work efficiency. FIG. 14 shows a histogram of the carriers 2-1 to 2-10 with respect to the number of times of transport.

In the present embodiment (FIG. 14), the carrier 2-3 of which the number of times of transport in the histogram is one, which is less than an average value by twice the standard deviation (2σ) or more, is extracted by way of example. In the present embodiment, the carrier having low work efficiency is extracted using divergence from an average value, on the assumption of a normal distribution. However, it is also possible to utilize other divergence anomaly extraction techniques, such as one by which outliers are extracted by applying clustering, One Class SVM or the like with respect to the number of times of transport or the like.

<Outline of Extraction of Work with Low Work Efficiency Type (Anomaly Level Determination)>

FIG. 15 illustrates an example of an anomaly level determination process performed by an anomaly level determination/extraction process program 608.

The anomaly level determination/extraction process program 608 performs a process for extracting work types having particularly low work efficiency among the carriers, time bands, work and the like having low work efficiency that have been extracted by the extraction process program 607. In the present embodiment (the example of FIG. 15(*a*)), a histogram of required time is created for each carrier work type (such as loading work, outbound path/return path movement, and dumping work), and, among the required times of the carrier 2-3 having low work efficiency extracted by the extraction process program 607, the return path movement time corresponding to the work having a large divergence from an average is determined as being anomalous.

In a region 1501, a histogram of all the carriers created with respect to loading work, outbound path movement, dumping work, and return path movement is shown. The anomaly level determination/extraction process program 608, based on such information, determines divergence of the carrier extracted by the extraction process program 607 from the average value (in FIG. 15(*b*), the example of return path movement time is shown). In the present embodiment, divergence from the average is utilized as an anomaly level, and, as a result, it is determined that the return path movement has the highest anomaly level, and that there is room for improvement. In the example of FIG. 15, anomaly determination is made using a histogram and divergence from the average value on the assumption of a normal distribution. However, it is also possible to utilize other anomaly extraction techniques, such as one by which outliers are extracted by applying clustering, One Class SVM or the like with respect to the return path movement time.

<Example of State of Carrier Movement>

Figure 16:
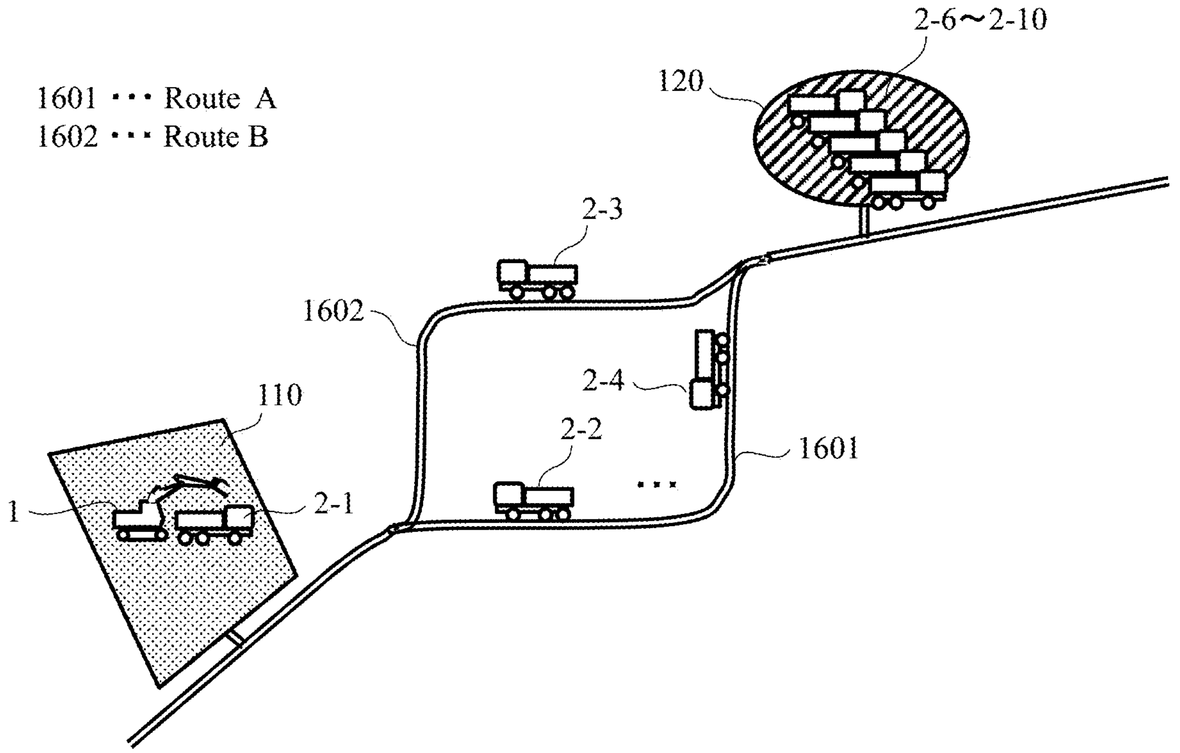
FIG. 16 illustrates an example of a moving route confirmation display for confirming the state of movement on a map.

FIG. 16 illustrates an example of moving route confirmation display for confirming the state of movement on a map. In the example of FIG. 16, a screen is shown for confirming on a map the moving route of the return path of the carrier 2-3 that showed a high anomaly level.

The return path movement of each of the carriers 2-1 to 2-10 can be displayed on a map using the position data. In the present embodiment, the carrier 2-3 is travelling along a route 1602 different from a route 1601 that the other carriers 2-1, 2-2 and 2-4 to 2-10 are taking. Thus, it is possible to easily confirm the probability that a difference in route is causing a change in work efficiency. In the present embodiment, the extraction of work efficiency decrease is performed by identifying the carrier having low work efficiency and its work type. However, this is by way of example and not by way of limitation.

<Contents of Work Management>

Figure 17:
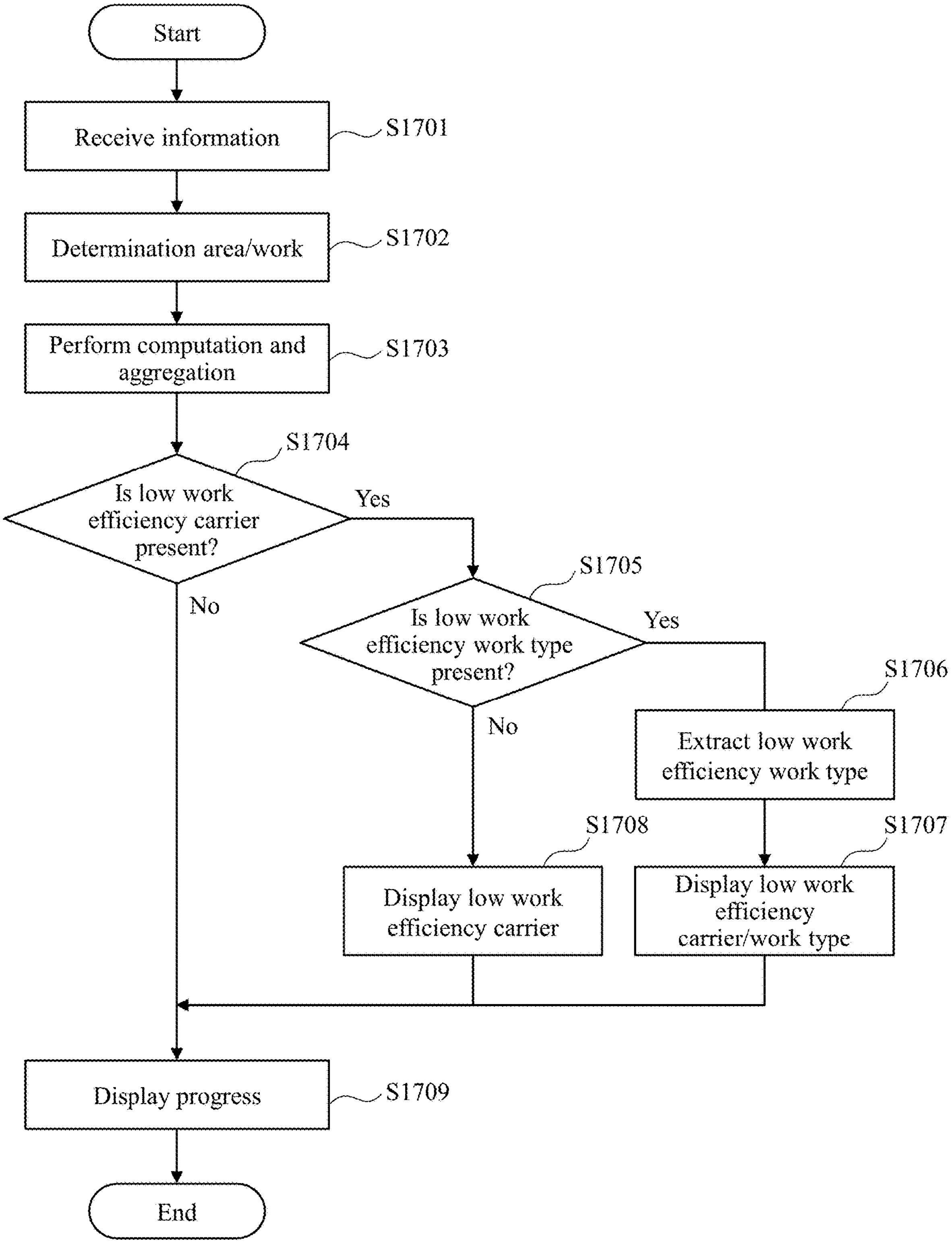
FIG. 17 is a flowchart describing a process for providing a work management display on a work terminal device 7 for confirmation by the manager of the earth-moving construction site according to the present embodiment.

FIG. 17 is a flowchart describing a process for providing work management display on the work terminal device 7 for confirmation by the manager of the earth-moving construction site of the present embodiment. Herein, the steps of FIG. 17 will be described by referring to various processing programs as the actor of the work management process. However, as noted above, the programs are read and executed by the computing unit 6*a*. Accordingly, various processing programs may be replaced by the computing unit (controller) 6*a*.

(i) Step 1701

The network interface 6*c* acquires, from the communication device (communications company base station) 4 or the carriers 2-1 to 2-10, respective position information constantly. Then, the network interface 6*c* stores the acquired information in the received information/determination results storage unit 604 and delivers the information to the determination process program 603.

(ii) Step 1702

The determination process program 603 determines the area (for example, whether the site or dumping location, or moving) and work type (for example, loading, standby, travel) of the carriers 2-1 to 2-10 at relevant times, and displays the determination results on the screen of the work terminal device 7. Then, the determination process program 603 stores the determination results in the received information/determination results storage unit 604.

(iii) Step 1703

The computing/aggregating process program 605 reads the determination results of the area and work type of each of the carriers 2-1 to 2-10 from the received information/determination results storage unit 604, and calculates (by performing a statistical process) the transported amount, the required time per cycle and the like for each work and time band of each of the carriers 2-1 to 2-10. The computing/aggregating process program 605 then stores the results of calculation in the computation/aggregate results storage unit 606 and delivers the results to the extraction process program 607.

(iv) Step 1704

The extraction process program 607 reads the computation/aggregate results from the computation/aggregate results storage unit 606, and, with respect to each carrier, determines if there is a carrier having low work efficiency compared with the other carriers. If there is, the extraction process program 607 extracts the information about the carrier. The extraction process program 607 then stores the results of the determination and extraction in the computation/aggregate results storage unit 606, delivers the results to the anomaly level determination/extraction process program 608, and transmits the information about the carrier having low work efficiency to the work terminal device 7 via the external network interface 6*e*. If there is a carrier having reduced work efficiency (Yes in step 1704), the process advances to step 1705. If there is no carrier having reduced work efficiency (No in step 1704), the process advances to step 1709. It should be noted that, when a normal distribution is assumed from the data and divergence from an average value is set, for example, the state of "no carrier with low work efficiency: No" may not appear in the determination at step 1704.

(v) Step 1705

The anomaly level determination/extraction process program 608, with respect to the carrier having reduced work efficiency, determines if there is a work type having reduced efficiency. If there is, the anomaly level determination/extraction process program 608 extracts the information about the work type with reduced efficiency. Specifically, the anomaly level determination/extraction process program 608 creates a histogram of required time for each of the work types (for example, loading work, outbound path/return path movement, and dumping work) of the carriers as illustrated in FIG. 15, and determines the presence or absence of a work type with low efficiency. If there is low-efficiency work (Yes in step 1705), the process advances to step 1706. If there is no low-efficiency work (when, for example, the efficiency of all works is lower compared to another carrier: No in step 1705), the process advances to step 1708. It should be noted that, when a normal distribution is assumed from the data and divergence from an average value is set, for example, the state of "no work type with reduced efficiency: No" may not appear in the determination at step 1705.

(vi) Step 1706

The anomaly level determination/extraction process program 608 stores the determination results in the computation/aggregate results storage unit 606, extracts the work type with low efficiency via the external network interface 6*e*, and transmits the information to the work terminal device 7.

(vii) Step 1707

The work terminal device 7 (or a controller thereof (not illustrated)) displays the information about the carrier having low work efficiency and information about the low-efficiency work type of the carrier on the display screen of the work terminal device 7.

(viii) Step 1708

The work terminal device 7 (or a controller thereof (not illustrated)) displays the information about the carrier having low work efficiency on the display screen of the work terminal device 7.

(ix) Step 1709

The work terminal device 7 displays the work progress status on the display screen of the work terminal device 7 (performs work progress display). For the work progress, for example, the manager measures the density of the earth in the construction site prior to construction (initial stage of construction) and calculates the mass (weight) per unit volume. By multiplying the per-unit-volume weight, the transport capacity specs of the carriers 2-1 to 2-10, and the number of times of transport by the carriers, it is possible to calculate a total transported amount (actual performance), which can be considered the work progress. It is also possible, for example, to measure the amount of earth dumped at the dumping location, and to input the measured value into the server device 6 as the work progress.

<Display Example of Carrier with Low Work Efficiency and Type of Low-Efficiency Work>

Figure 18:
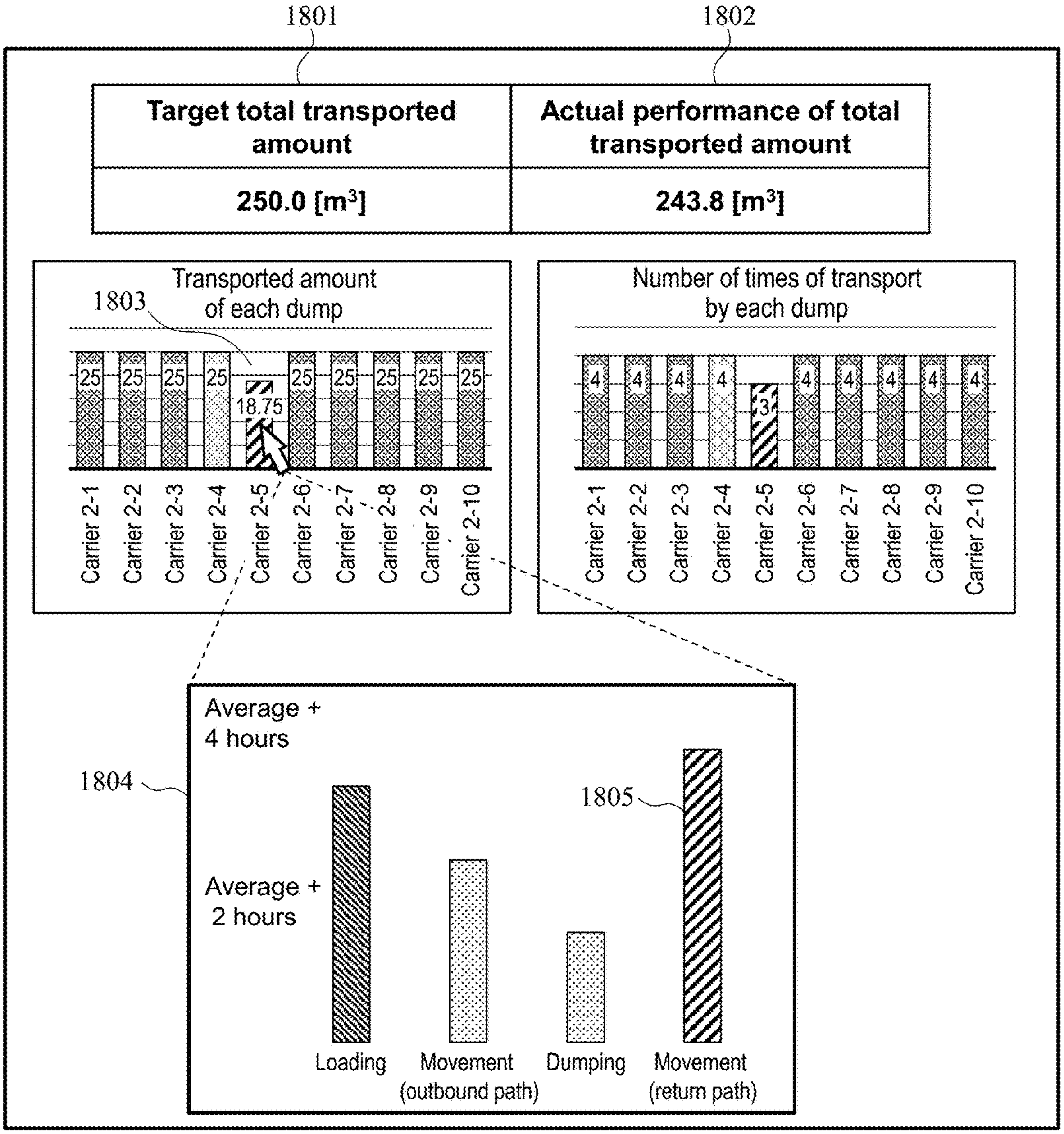
FIG. 18 illustrates, with respect to carriers, an example of a display of carriers having decreased transported amount and the work in which the carrier had an efficiency decrease.

FIG. 18 illustrates an example, with respect to the carriers 2-1 to 2-10, of a display of a carrier having a decreased transported amount and the work in which the carrier had an efficiency decrease.

The display screen of the work terminal device 7 shows, as the progress of the carriers 2-1 to 2-10, actual performance 1802 relative to a target total transported amount 1801, and further shows the transported amount and the number of times of transport by each of the carriers 2-1 to 2-10 as well as the temporal transitions thereof. Among others, the carrier 2-5 having low work efficiency that has been extracted by the extraction process program 607 is highlighted, as indicated by a bar 1803. For example, when the manager of the earth-moving construction site selects the carrier 2-5 of the bar 1803, the anomaly level of each work of the bar 1803 is displayed, as shown in a histogram 1804. In the histogram 1804, the work having the highest anomaly level (in the present embodiment, the return path movement) is displayed as a bar 1805. Further, when the histogram 1804 shows a plurality of works from which anomalous values have been extracted, for example, the anomaly levels are ranked according to the degree of divergence from an average value or the like, and the work having the highest anomaly level, which in the present embodiment is the return path movement, is highlighted the most and displayed.

As described above, in the construction management system of the present example, the elements of the work, carriers and the like with low work efficiency are automatically analyzed by the computing unit 6*a* of the server device 6, and the analysis results are provided to the construction site manager. In this way, it is possible for the construction site manager to keep track of the work status more easily at the construction site, and to improve the work efficiency of the construction site as a whole based on the work contents.

<Conclusion>

(i) In the present embodiment, the server device 6 performs: a process of acquiring position information about at least one carrier; a process of generating work type information indicating whether the carrier is performing a predetermined work or moving (for example, excavation, loading, standby, moving, or other (separate) work) based on the position information; a process of calculating a required time for each work type information item of the carrier; a process of comparing the required time for each work type information item and extracting a work element with low work efficiency based on a first rule concerning required time (for example, "select the work that has taken the longest required time" or "select the work having diverged from an average value of the required times of all types of work by a predetermined time or longer"); and a process of outputting the extracted work element with low work efficiency (for example, displaying on the display screen of the work terminal device 7). Thus, by extracting and outputting (letting the manager know) the information about the work element with low work efficiency, it is possible to help improve the work efficiency of the relevant carrier.

The work element with low work efficiency is outputted together with information about a target work amount and information about an actually performed work amount indicating a work progress. In this way, it is possible to determine whether a target can be achieved by improving the low-efficiency work.

(ii) In the present embodiment, a plurality of carriers 2-1 to 2-10 and a work machine (heavy equipment 1) are managed by the construction management system. In this case, the server device 6 performs: a process of acquiring position information about each of the plurality of carriers 2-1 to 2-10 and position information about at least one work machine; a process of generating work type information about the plurality of carriers 2-1 to 2-10 and the work machine for each predetermined time period based on the position information about the plurality of the carriers and the work machine; a process of extracting, among the plurality of carriers, a carrier with a low work amount, based on a second rule concerning work amount (for example, "select a carrier with the smallest work amount" or "select a carrier with a work amount of not more than $-\sigma$ or $-2\sigma$($\sigma$ is standard deviation)); a process, with respect to the extracted carrier with low work amount, of comparing the required time for each work type information item and extracting a work element with low work efficiency according to a first rule (for example, "select the work that has taken the longest required time" or "select the work having diverged from an average value of the required times of all types of work by a predetermined time or longer); and a process of outputting information about the carrier with low work amount and the work element with low work efficiency. That is, the carrier with a work amount less than a predetermined condition (a predetermined condition or less) is initially extracted, and the required times of the types of work performed by the carrier are compared to extract which work is causing a bottleneck for the carrier. In this way, the manager can know exactly where the improvement needs to be made.

The travel/movement of the carriers (for example, movement from the site (site 1) to the processing location (dumping location: site 2)) or the travel of the carriers in the site and the processing location (sites) are detected by a temporal change in the position information about each carrier. The temporal change in the position information may also be utilized to calculate the moving speed of a carrier. Based on the position information, it is also possible to determine the location where the carrier is present at the timing of generation of the work type information (for example, whether at the site, at the processing location (dumping location), or on a travelling path (for example, a road) connecting the site and the dumping location). Further, based on the position information, the presence or absence of adjacency of the carrier to the work machine at the timing of generation of the work type information (whether the position of the carrier and the position of the work machine are adjacent to each other) may be determined. If the carrier is adjacent to the work machine, it may be determined that the carrier and the work machine are cooperating with each other to perform a first work. Also, based on operation sensing information from a sensor provided in the carrier (for example, a sensor for sensing operation of the carrier bed (such as a hydraulic sensor)), it may be determined that, at the timing of generation of the work type information, the carrier is performing a second work (for example, dumping work at the dumping location). Further, based on the position information about the carrier being subjected to determination among the plurality of carriers and a temporal change in the position information, it may be determined whether, in a predetermined area, a separate carrier preceding the carrier being subjected to determination is present, and whether the carrier being subjected to determination is standing by in the predetermined area (for example, it is determined that the carrier in question is standing by if no detection is made of the carrier having entered the site or the processing location and done work, or if the carrier is not travelling but is at rest for a certain duration of time).

For example, a work course along which the carriers make the rounds may comprise a plurality of locations and a road connecting the plurality of locations, the plurality of locations including a site in which the first work (for example, loading) is performed and another site (dumping location) in which the second work (for example, dumping) is performed. In this case, a cycle rule of the work course (for example, one cycle consists of entry to the site and exit after work→outbound path→entry to the dumping location and exit after work→return path→arrival at the site) may be defined in advance. In this case, the server device 6, based on the position of the carrier information and the cycle rule, may calculate the number of cycles made by the carrier along the work course and output the information about the number of cycles as information about the number of times of transport by the carrier, together with the work element with low work efficiency.

(iii) The functions of the present embodiment may be implemented by software program code. In this case, a storage medium having the program code recorded thereon may be provided to a system or a device, and a computer (or a CPU or an MPU) of the system or device reads the program code stored in the storage medium. In this case, the program code per se read from the storage medium implements the functions of the embodiment described above, and the program code per se and the storage medium having the same stored thereon constitute the present invention. Examples of the storage medium for supplying such program code include a flexible disc, a CD-ROM, a DVD-ROM, a hard disk, an optical disk, a magneto-optical disk, a CD-R, magnetic tape, a non-volatile memory card, and a ROM.

Also, an operating system (OS) or the like running on a computer may perform some or all of actual processes based on the instruction of program code, and the functions of the embodiment described above may be implemented by the processes. Further, after the program code read from the storage medium is written to memory on a computer, some or all of actual processes may be performed by a CPU or the like of the computer based on the instruction of the program code, and the functions of the embodiment described above may be implemented by the processes.

Further, software program code for implementing the functions of the embodiment may be delivered via a network, stored in a storage means, such as a hard disk or memory of a system or a device, or in a storage medium, such as a CD-RW or a CD-R. When in use, the program code stored in the storage means or the storage medium may be read and performed by a computer (or a CPU or an MPU) of the system or device.

It should be understood that the processes and techniques discussed herein are not essentially associated with any specific devices, and may be implemented by any appropriate combination of components. Furthermore, it is possible to use various types of general-purpose devices in accordance with the teachings described herein. It may be found beneficial to construct a dedicated device to perform the steps of the methods discussed herein. Various inventions may be formed by appropriate combinations of the plurality of constituent elements disclosed in the embodiment. For example, some constituent elements may be deleted from the constituent elements indicated in the embodiment. Further, constituent elements from different embodiments may be combined, as appropriate. Although the present invention has been described with reference to specific examples, they are to be construed in all aspects as illustrative and not restrictive. It will be recognized by those skilled in the art that there is a number of combinations of hardware, software, and firmware suitable for practicing the present invention. For example, the described software may be implemented by a wide range of programs or script languages, such as assembler, C/C++, Perl, Shell, PHP, and Java (registered trademark).

Further, in the foregoing embodiment, the control lines and information lines indicated are those considered necessary for the purposes of explanation, and do not necessarily indicate all of the control lines and information lines required in a product. All of the structures may be interconnected.

Additionally, other implementations of the present invention will become apparent to those having ordinary skill in the relevant art upon examination of the description of the present invention and embodiments disclosed herein. The description and embodiments are merely exemplary, and the scope and spirit of the present invention are indicated by the following claims.

REFERENCE SIGNS LIST

1 Heavy equipment (work machine)
2-1 to 2-10 Carrier
3 Positioning satellite
4 Communication device
5 Internet
6 Server device
**6*a*** Controller (computing unit)
**6*b*** Storage device (first storage unit)
**6*c*** Network interface
**6*d*** Second storage unit
**6*e*** External network interface
Work terminal device
100 Construction site
110 Work area (excavation site)
120 Work area (processing location: dumping location)
601 Setting process
602 Area/work setting information storage unit
603 Determination process program
604 Received information/determination results storage unit
605 Computing/aggregating process program
606 Computation/aggregate results storage unit
607 Extraction process program
608 Anomaly level determination/extraction process program

The invention claimed is:

1. A construction management system, comprising:

a server for generating and outputting work management information for managing a work status of a carrier of a plurality of carriers, the server comprising:

a storage device for storing a program for generating the work management information, and a controller for reading the program from the storage device, executing the program, and generating the work management information, wherein the controller is configured to perform:

a process of acquiring position information about the plurality of carriers;

determining whether each of the plurality of carriers are in one of a first predetermined area and a second predetermined area based on the position information;

a process of generating work type information indicating whether a determination target carrier is performing a predetermined work or moving, based on whether the plurality of carriers are in the first predetermined area or the second predetermined area, and based on whether a different carrier than the determination target carrier, among the plurality of carriers, entered and remains in the one of the first predetermined area and the second predetermined before the determination target carrier;

a process of calculating a required time for each work type information item of the determination target carrier;

a process of extracting a carrier with a low work amount among the plurality of carriers based on a first rule concerning work amount;

a process, with respect to the extracted carrier with low work amount, of comparing the required time for each work type information item and extracting a work element with low work efficiency based on a second rule concerning required time; and a process of outputting the information about the carrier with low work amount and the work element with low work efficiency.

2. The construction management system according to claim 1, wherein the controller outputs, together with the work element with low work efficiency, information about a target work amount and information about an actually performed work amount indicating a work progress.

3. The construction management system according to claim 1, wherein the controller performs:

a process of acquiring position information about at least one work machine; and a process of generating the work type information about the plurality of carriers and the work machine for each predetermined time period based on the position information about the plurality of carriers and the work machine.

4. The construction management system according to claim 1, wherein the controller determines the presence or absence of movement of the carrier based on a temporal change in the position information.

5. The construction management system according to claim 4, wherein the controller performs a process of determining a location where the carrier is present based on the position information at the timing of generation of the work type information.

6. The construction management system according to claim 5, wherein the controller performs a process of determining, based on the position information, the presence or absence of adjacency of the carrier to the work machine at the timing of generation of the work type information, and determining, if the carrier is adjacent to the work machine, that the carrier and the work machine are cooperating with each other to perform a first work.

7. The construction management system according to claim 6, wherein the controller determines, based on operation sensing information from a sensor provided in the carrier, that the carrier is performing a second work at the timing of generation of the work type information.

8. The construction management system according to claim 1, wherein, with respect to a work course comprising a plurality of locations and a road connecting the plurality of locations, the plurality of locations including a site in which a first work is performed and another site in which a second work is performed, a cycle rule is defined in advance, wherein the controller performs:

a process of calculating, based on the position information about the carrier and the cycle rule, a number of cycles made by the carrier in the work course; and a process of outputting, together with the work element with low work efficiency, information about the number of cycles as information about the number of times of transport by the carrier.

* * * * *